(12) United States Patent
Kempf et al.

(10) Patent No.: US 6,848,738 B2
(45) Date of Patent: Feb. 1, 2005

(54) VEHICLE STRUCTURE FOR PEDESTRIAN PROTECTION

(75) Inventors: Peter C. Kempf, Dexter, MI (US); Simon Xunnan He, Troy, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 19 days.

(21) Appl. No.: 10/602,861

(22) Filed: Jun. 25, 2003

(65) Prior Publication Data

US 2004/0262952 A1 Dec. 30, 2004

(51) Int. Cl.⁷ ................................................ B60J 7/00
(52) U.S. Cl. ........................ 296/187.04; 296/193.11; 180/69.2
(58) Field of Search ................. 296/187.04, 193.11; 180/69.2

(56) References Cited

U.S. PATENT DOCUMENTS

| | | | |
|---|---|---|---|
| 5,785,368 A | 7/1998 | Hartmann et al. | 293/134 |
| 5,988,305 A * | 11/1999 | Sakai et al. | 296/187.04 |
| 6,179,364 B1 * | 1/2001 | Takahashi | 296/76 |
| 6,212,456 B1 | 4/2001 | Stride | 701/45 |
| 6,329,910 B1 | 12/2001 | Farrinton | 340/436 |
| 6,375,251 B1 * | 4/2002 | Taghaddos | 296/187.03 |
| 6,467,563 B1 | 10/2002 | Ryan et al. | 180/274 |
| 6,474,679 B2 | 11/2002 | Miyasaka et al. | 280/730.1 |
| 6,516,278 B1 | 2/2003 | Ishizaki et al. | 702/33 |
| 6,641,209 B2 * | 11/2003 | Warwel et al. | 180/69.2 |
| 2002/0014761 A1 | 2/2002 | Miyasaka et al. | 280/730.1 |
| 2002/0093180 A1 | 7/2002 | Breed | 280/730.1 |
| 2003/0042714 A1 | 3/2003 | Sawa | 280/730.1 |
| 2003/0062208 A1 | 4/2003 | Hamada et al. | 180/274 |

FOREIGN PATENT DOCUMENTS

JP   62-26170   *   2/1987

* cited by examiner

*Primary Examiner*—Joseph D. Pape
(74) *Attorney, Agent, or Firm*—Lonnie Drayer

(57) ABSTRACT

A vehicle body assembly has an outer skin panel defining an exterior surface for a vehicle. An inner skin panel is spaced from the outer skin panel. One or more energy absorbing bodies are located between the inner skin panel and the outer skin panel such that the one or more energy absorbing bodies will be aligned with one or more hard points of the vehicle. The energy absorbing body may be a foam block or a hollow body such as a fluid reservoir.

10 Claims, 2 Drawing Sheets

VEHICLE STRUCTURE FOR PEDESTRIAN PROTECTION

FIELD OF THE INVENTION

This invention relates to a vehicle structure for protecting a pedestrian.

BACKGROUND OF THE INVENTION

A vehicle body panel assembly typically comprises an outer skin and an inner skin. The outer skin serves as the exterior surface of the vehicle while the inner skin is spaced from the outer skin and is located toward the interior of the vehicle. For many body panel assemblies steel structures are sandwiched between the outer skin and the inner skin to provide a protective framework surrounding the passenger compartment to protect vehicle occupants in the event of an accident. In addition, the inner skin may be very hard to provide support for the body panel assembly.

Recently, manufacturers have directed their attention to developing safety systems to prevent injury to a pedestrian hit by a vehicle. Current body panel assemblies raise concerns about injury to pedestrians due to the hardened structures of these assemblies. Manufacturers have developed vehicle exterior airbag systems to cushion the impact of a pedestrian against these panel assemblies. These airbag systems add significant cost to the vehicle and also require a significant amount of space within the vehicle. They also require time to deploy in an accident and may obstruct the view of the driver of the vehicle following deployment.

The hood of a vehicle presents a particular design challenge. The hood not only has hard support structures but further covers unyielding engine components that may present a hard point for injury in the event of a front end accident with a pedestrian. Moreover, there is very little room under the hood to accommodate pedestrian protection systems.

A need therefore exists for an inexpensive body panel assembly that reduces the severity of a pedestrian injury in the event of an accident without the need for an external airbag system.

SUMMARY OF THE INVENTION

The inventive body panel assembly comprises an outer skin and an inner skin spaced from the outer skin. The outer skin serves as the exterior surface for a vehicle. In contrast to existing body panel assemblies, the inventive body panel assembly has one or more energy absorbing bodies spaced between the outer skin panel and one or more hard points of the vehicle. Consequently, an impact of a pedestrian on the body panel assembly is cushioned by the energy absorbing body.

A vehicle hood of the inventive design has an outer skin and an inner skin spaced from the outer skin. A cavity is formed between the outer skin and the inner skin. The one or more energy absorbing bodies may be received in the cavity. This design permits the energy absorbing body to be placed within the vehicle hood without taking up space under the hood and at very little cost.

The energy absorbing body may be a foam block or a hollow body, such as a fluid reservoir for antifreeze or windshield wiper fluid. The energy absorbing body may be further spaced from other energy absorbing bodies.

Thus, the outer skin is spaced from an inner skin to form a vehicle body panel. Hard points on the vehicle are located relative to the vehicle body panel. Energy absorbing bodies are then placed between the outer skin and the vehicle hard point.

BRIEF DESCRIPTION OF THE DRAWINGS

The various features and advantages of this invention will become apparent to those skilled in the art from the following detailed description of the currently preferred embodiment.

DETAILED DESCRIPTION OF THE INVENTION

As used herein and in the claim terms describing locations such as "above", "below", "forward", "rearward" and so forth are understood to be in relation to a motor vehicle that is sitting upright.

Figure 1:
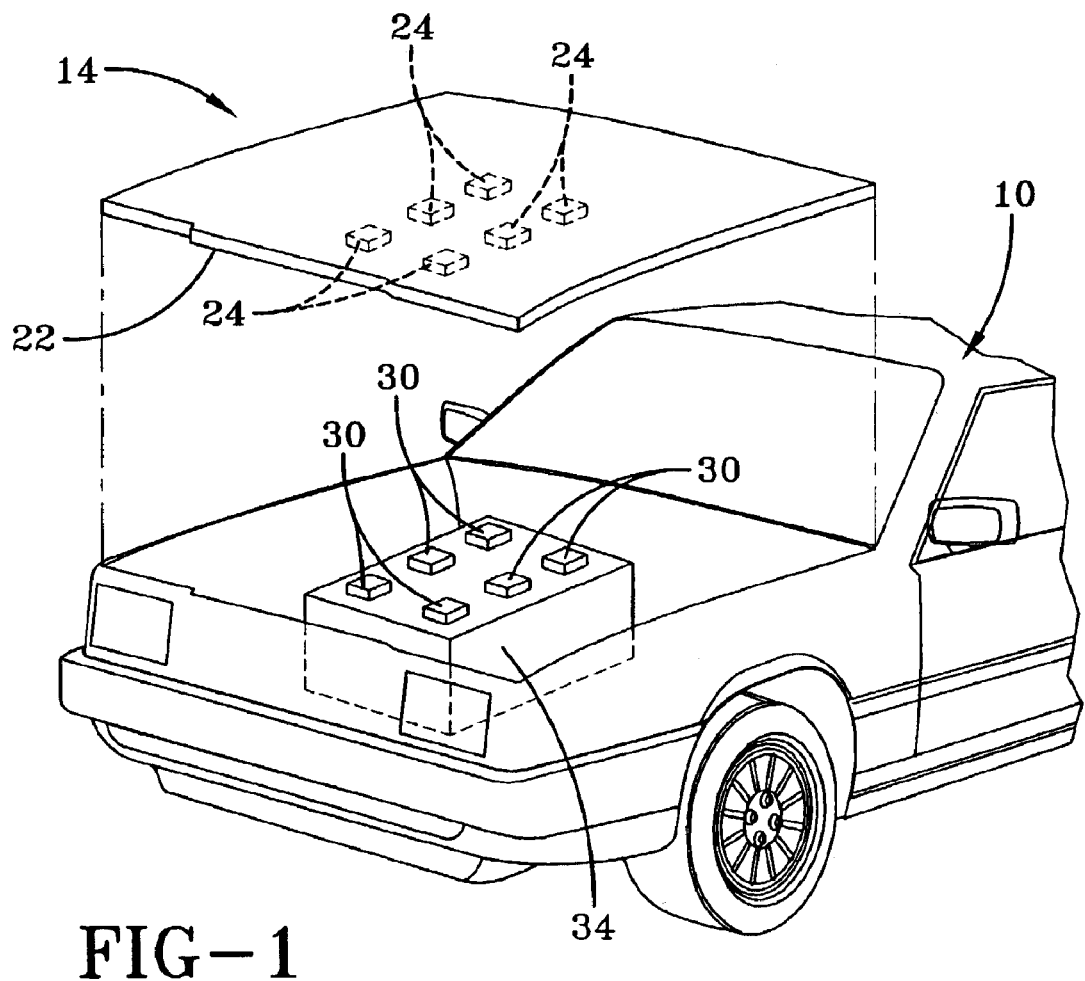
FIG. 1 is a perspective view of a vehicle employing the inventive vehicle body panel, here a hood.

FIG. 1 is a perspective view of a vehicle body panel assembly 14 on a vehicle 10. As shown, the vehicle body panel assembly 14 is a vehicle hood placed over an engine 34 and having an outer skin panel 18, which forms the exterior surface for the vehicle 10. The inner skin panel 22 is spaced from the outer skin panel 18. In contrast to existing vehicle body panel assemblies, the inventive vehicle body panel assembly 14 has energy absorbing bodies 24 located between the outer skin panel 18 and hard points 30 of vehicle 10. In this way, a pedestrian hitting the vehicle body panel assembly 14 would have his impact against hard points 30 cushioned by the energy absorbing bodies 24. As used herein and in the claims a "hard point" of a vehicle comprises a hard vehicle component that is located interior of a vehicle body panel, including the hood, and is so close to the vehicle body panel that if a pedestrian impacts the vehicle body panel it is likely that the vehicle body panel will be deformed sufficiently that the body panel will impact the vehicle component and the pedestrian will also effectively impact the vehicle component.

Figure 2:
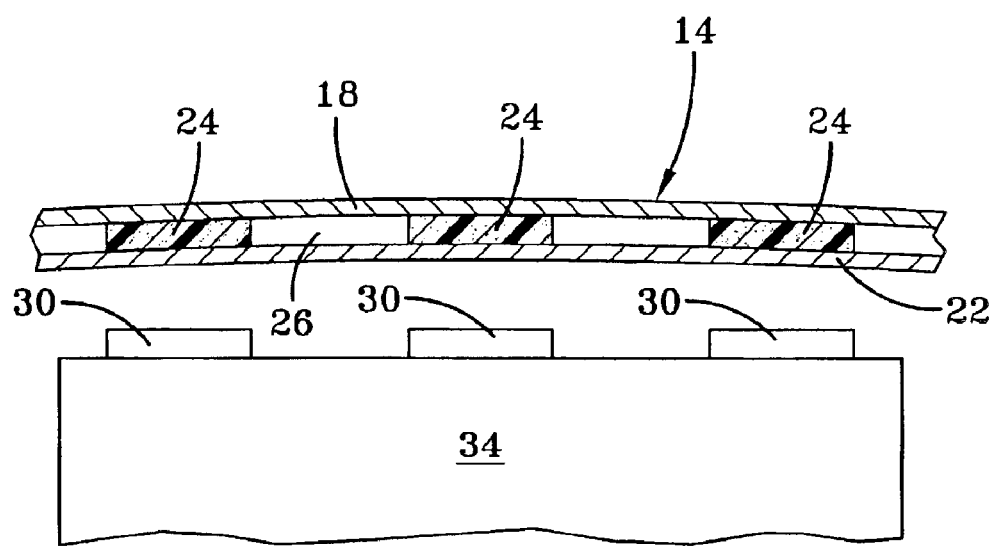
FIG. 2 is a cross-sectional view of the hood of FIG. 1, highlighting the location of energy absorbing bodies.

FIG. 2 illustrates the arrangement of the energy absorbing bodies 24 within the vehicle body assembly 14. In this design, the outer skin panel 18 is spaced from the inner skin panel 22. The inner skin panel 22 may be the hood structure for vehicle 10. A cavity 26 is formed between the outer skin panel 18 and the inner skin panel 22. Energy absorbing bodies are sandwiched between the outer skin panel 18 and the inner skin panel 22 and are located over the hard points 30 of the engine 34. The energy absorbing bodies 24 may be foam blocks such as STYROFOAM™ or HEXCELL™ or other energy absorbing material. The energy absorbing body 24 may also be hollow bodies, such as fluid reservoirs for windshield wiper or antifreeze fluid. The location under the hood of these existing reservoirs facilitates their use as energy absorbing bodies. Moreover, their use in this way is space saving.

Figure 3:
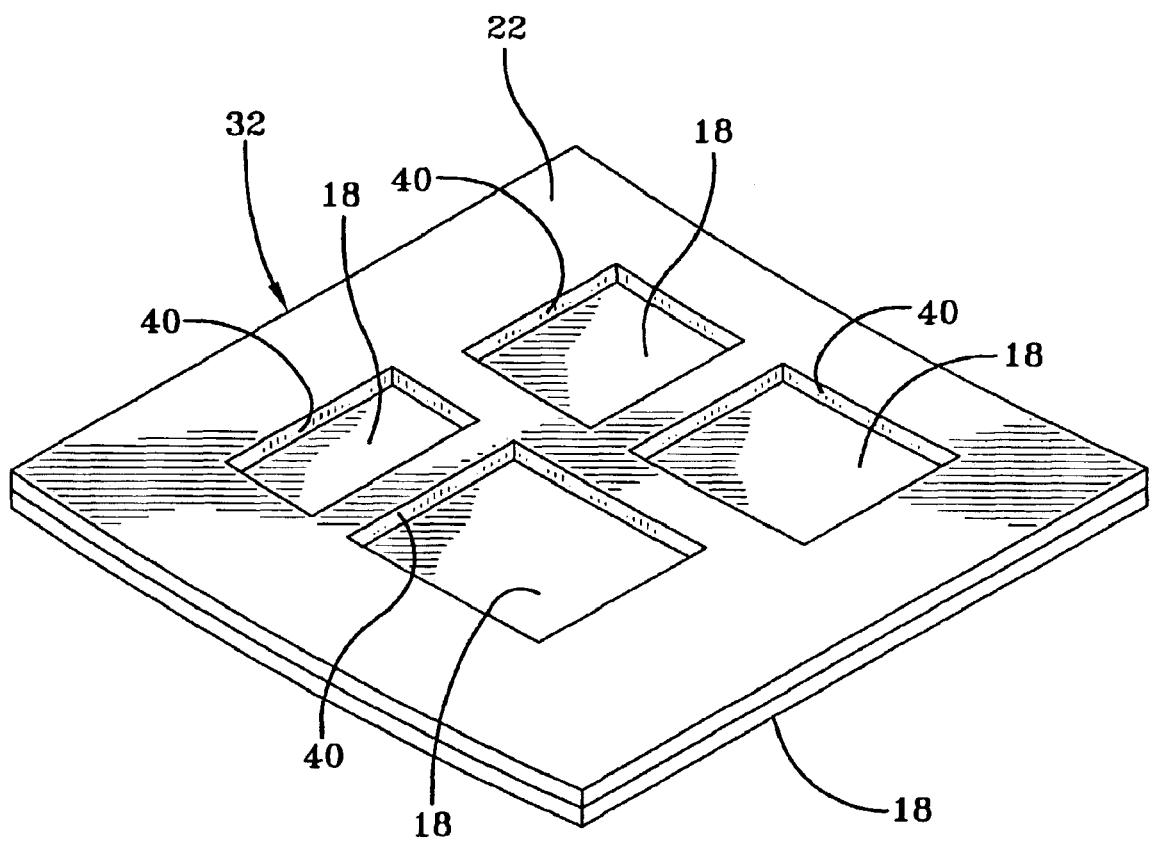
FIG. 3 illustrates an alternative design embodying the invention, highlighting cavities within the inventive vehicle body panel to receive energy absorbing bodies.

FIG. 3 illustrates an alternative design for a vehicle body panel assembly. Here a vehicle body panel assembly 32 is shown upside down with an outer skin panel 18 on the bottom and inner skin panel 22 on top. Spaced into the inner skin panel 22 are holes 40 to receive an energy absorbing body, such as a fluid reservoir 38 as shown in FIG. 4.

Figure 4:
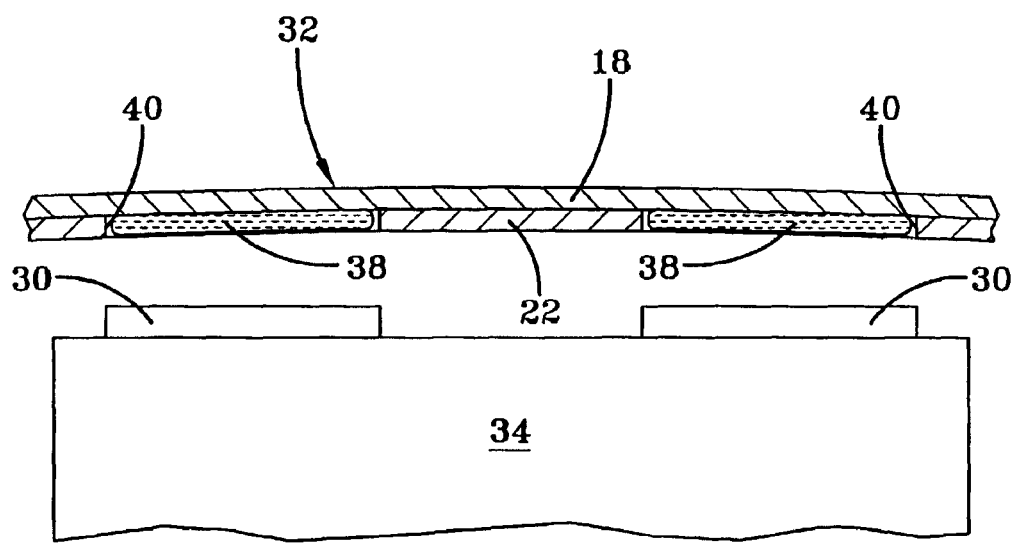
FIG. 4 is a cross-sectional view of the alternative design of FIG. 3, showing placement of energy absorbing body over an engine hard point.

FIG. 4 illustrates that the fluid reservoir 38 as well as the holes 40 may be located over hard point 30 of the engine 34. By placing the fluid reservoir 38 above a hard point 30, this particular region of the vehicle body panel assembly 32 is cushioned for potential pedestrian impact. Moreover, this design permits the placement of energy absorbing bodies without an increase of width of the vehicle body panel assembly 14.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A vehicle body panel assembly, comprising: an outer skin panel defining an exterior surface of a vehicle and an inner skin panel spaced from said outer skin panel and one or more energy absorbing bodies located between said outer skin panel and said inner skin panel and located such that when the body panel assembly is installed on a vehicle the energy absorbing bodies are aligned with one or more hard points of the vehicle, wherein one or more said energy absorbing bodies comprises a foam block.

2. The vehicle body panel assembly of claim 1 wherein said vehicle body panel comprises a vehicle hood.

3. A vehicle body panel assembly, comprising: an outer skin panel defining an exterior surface of a vehicle and an inner skin panel spaced from said outer skin panel and one or more energy absorbing bodies located between said outer skin panel and said inner skin panel and located such that when the body panel assembly is installed on a vehicle the energy absorbing bodies are aligned with one or more hard points of the vehicle, wherein one or more said energy absorbing bodies comprises a hollow block that is a fluid reservoir.

4. The vehicle body panel assembly of claim 3 wherein said fluid reservoir comprises a window wiper fluid reservoir.

5. The vehicle body panel assembly of claim 3 wherein said fluid reservoir comprises an anti-freeze fluid reservoir.

6. A vehicle hood comprising:
an outer skin defining an exterior surface of a vehicle hood;
an inner skin spaced from said outer skin;
a cavity formed between said outer skin and said inner skin; and one or more energy absorbing bodies at least partially received in such cavity such that when the vehicle hood is installed on a vehicle the one or more energy absorbing bodies are aligned with one or more hard points of the vehicle, wherein one or more of said energy absorbing bodies comprises a foam block.

7. The vehicle hood of claim 6 wherein said energy absorbing bodies are spaced apart from each other.

8. A vehicle hood comprising:
an outer skin defining an exterior surface of a vehicle hood;
an inner skin spaced from said outer skin;
a cavity formed between said outer skin and said inner skin; and one or more energy absorbing bodies at least partially received in such cavity such that when the vehicle hood is installed on a vehicle the one or more energy absorbing bodies are aligned with one or more hard points of the vehicle, wherein one or more of said energy absorbing bodies comprises a hollow body that is a fluid reservoir.

9. The vehicle hood of claim 8 wherein said fluid reservoir comprises a window wiper fluid reservoir.

10. The vehicle hood of claim 8 wherein said fluid reservoir comprises an anti-freeze fluid reservoir.

* * * * *